United States Patent [19]

Grant

[11] Patent Number: 4,706,314
[45] Date of Patent: Nov. 17, 1987

[54] PROTECTIVE CURL HAIR STYLE PILLOW CASE

[76] Inventor: Arie L. Grant, 1601 E. 35th St., Savannah, Ga. 31404

[21] Appl. No.: 11,260

[22] Filed: Feb. 5, 1987

Related U.S. Application Data

[63] Continuation-in-part of Ser. No. 809,390, Mar. 17, 1986, Pat. No. 4,662,014.

[51] Int. Cl.⁴ .............................................. A47G 9/00
[52] U.S. Cl. .......................................... 5/490; 5/484
[58] Field of Search ............... 5/490, 501, 487, 484, 5/434, 496, 482, 436, 473, 500, 502; 297/220

[56] References Cited

U.S. PATENT DOCUMENTS

| | | | |
|---|---|---|---|
| 2,620,494 | 12/1952 | Kay | 5/501 |
| 2,660,735 | 12/1953 | Baum | 5/484 |
| 3,423,774 | 1/1969 | Streetman | 5/490 |
| 3,602,928 | 9/1971 | Heltzer | 5/490 |
| 4,330,892 | 5/1982 | Fukushima | 5/490 |

FOREIGN PATENT DOCUMENTS

| | | | |
|---|---|---|---|
| 2356949 | 5/1975 | Fed. Rep. of Germany | 5/484 |
| 418482 | 10/1934 | United Kingdom | 5/484 |

Primary Examiner—Alexander Grosz
Attorney, Agent, or Firm—Jerome J. Norris

[57] ABSTRACT

A pillowcase, having a three-layered inlay formed integrally into at least one of its sides to allow maintenance of the curl hair style without a bonnet and prevention of pillowcase soiling outside the area of the inlay from oils and greases used to produce the curl style.

2 Claims, 2 Drawing Figures

PROTECTIVE CURL HAIR STYLE PILLOW CASE

BACKGROUND OF THE INVENTION

The present invention is a continuation-in-part of U.S. application Ser. No. 809,390, filed on Mar. 17, 1986 now U.S. Pat. No. 4,662,014 and pertains to new and useful improvements in means for maintaining the "curl" hair style.

Wearers of modern hairstyles known as the "curl", which is a form of permanent waving that employs water base products that contain oils, greases and moisturizers, must use some form of bonnet during rest to maintain the hair style.

FIELD OF THE INVENTION

The invention relates to means for maintaining the curl hair style without a bonnet while resting or sleeping by using a pillow case having an integral inlaid three-layered area within its rectangular or other geometrical confines.

Any soiling of the pillow case area surrounding the inlaid area which may result from cosmetics, oils, greases, activators and moisturizers is prevented because the inlay is composed of: a top layer adopted to repel some moisture; a center polyester matting cushion layer; and a water proof bottom layer of a rubberized flannelette material.

SUMMARY OF THE INVENTION

One object of the invention is to provide a machine washable pillow case having a three-layered inlay for maintenance of the curl hair style without a bonnet, and preventing soiling of the pillowcase areas outside of the inlay from oils, greases, activators and moisturizers used in creating the hairstyle.

Another object of the invention is to provide a machine-washable pillowcase having a three-layered, moisture proof inlay, that allows maintenance of the curl hair style without a bonnet, wherein the upper layer of the inlay has a smoothness which repels some moisture in the hair to assist in maintenance of the hair style.

A yet further object of the invention is to provide a machine-washable pillowcase having a three-layered inlay for maintenance of the curl hair style without a bonnet, wherein low friction will exist between the upper layer of the inlay and curl hair, so as to cause less wear on each strand of hair.

The foregoing and other objects of the invention will become apparent from the description hereinafter set forth.

DETAILED DESCRIPTION OF THE INVENTION

Figure 1:
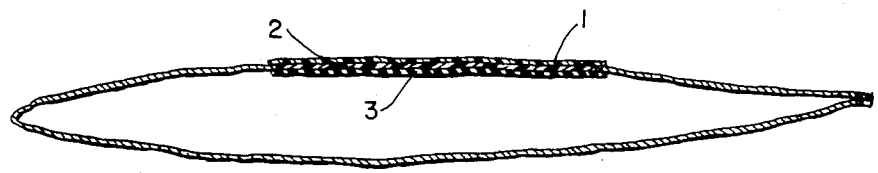
FIG. 1 is a side view in perspective of the three-layered inlay pillowcase taken along line A—A of FIG. 2.
Figure 2:
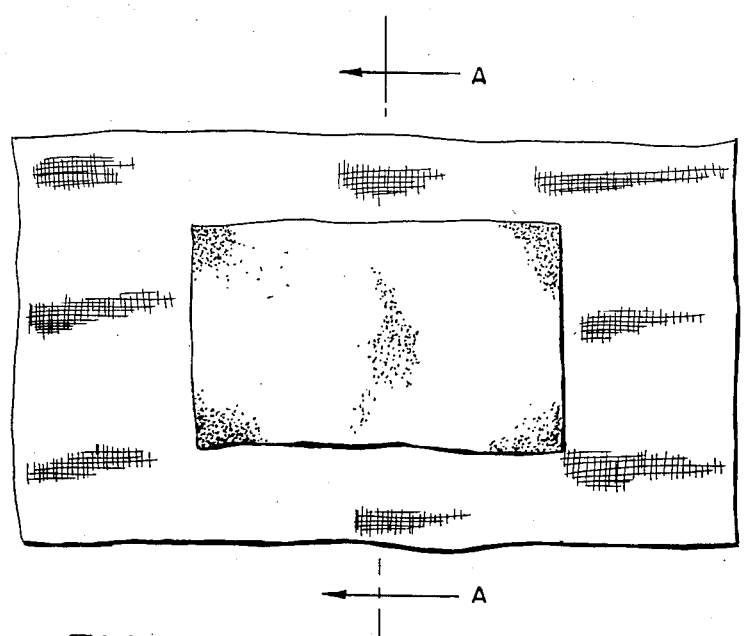
FIG. 2 a top view of the three-layered inlay pillowcase.

In the preferred embodiment, which can be better understood by reference to FIG. 1, a side view of a pillowcase having a three-layered inlay in the upper part is shown.

Top layer 1, of the inlay is a polyester material which has been treated with a Zepel fabric fluoridizer. The top layer is a machine-washable polyester, and the Zepel treatment renders it stain resistant and gives it the characteristics to repel some moisture. Also, the smooth nature of the material keeps some moisture in the hair, and this accommodates the moisture needs of hair styles like the "cold wave", which needs products known as moisturizers and activators. Further, the texture of the top layer is smooth, and this tends to lessen friction between it and the hair, and therefore facilitates and encourages good health of the hair.

Center or middle layer 2, of the inlay is composed of a machine-washable polyester matting of $\frac{1}{4}$ inch in thickness, and serves to cushion the structure, which can be rectangular in shape.

Bottom layer 3 of the inlay is made of a rubberized flannelette material. This moisture proof bottom layer is textured to compliment the material it is used or placed against. For example, the moisture proof rubberized flannelette material has a minimal amount of noise factor, which accents comfort, when used.

The top, center and bottom layers of the inlay are stitched together with a polyester thread, and when the inlay is stitched into the top or upper part of the pillowcase, the hair style can be maintained without a bonnet. This aids the health of the scalp by keeping the scalp exposed to the proper ventilation, and also allows less friction on the hair when it is moved across the top layer polyester material, which is treated with Zepel fabric fluoridizor.

Since the three-layered inlay is an integral part of the top side of the pillowcase, the pillowcase area outside of the perimeter of the inlay is kept free from stains which may be left by products used on the hair as well as cosmetics which may be left on the face.

Moreover, the quality of the material used in the inlay makes caring for it along with the entire pillowcase simple, because the inlay's top layer is stain resistant, and the whole inlay is machine-washable and tumble dryable along with the entire pillowcase in a conventional electric dryer.

The use of the novel three-layered inlaid pillowcase eliminates the need to cover the curl hair style with bonnets, etc., during rest, thereby giving the hair and scalp better ventilation.

While the invention has been described with reference to the preferred embodiments, wherein the three-layered inlay is of a rectangular design fitting within the rectangular confines of the upper side of a pillowcase, it is to be understood that any geometrical inlay design including extension of the inlay to one or more of the pillowcase borders can be used, and that both the upper and lower sides of the pillowcase can have the inlay made integral therein, without departing from the spirit and scope of the intention of the invention, which is defined by the appended claims.

What is claimed is:

1. A pillowcase having a three-layered, machine washable, moisture proof inlay formed integrally into at least one of its sides so that when fitted around a pillow, maintenance of the curl hair style without a bonnet is allowed and prevention of soiling of the pillowcase outside of the inlaid areas by cosmetics, oils, greases, activators and moisturizers used in curl permanent waving is allowed, wherein said inlay comprises:

a top layer of smooth, low friction polyester material treated with a fabric fluoridizor sold under the trademark ZEPEL, said treated polyester material adopted to repel some moisture, thus keeping it in the hair;

a center polyester matting cushioning layer; and a waterproof bottom layer of a rubberized flannelette material;

said layers being stitched together and said inlay stitched into at least one of the sides of said pillowcase.

2. A method of maintaining the curl hair style without a bonnet while preventing soiling of a pillowcase by curl hair users of cosmetics, oils, greases, activators and moisturizers on a pillowcase outside the area of a three-layered inlay of the pillowcase of claim 1, comprising: removably placing said pillowcase over a pillow prior to resting or sleeping.

* * * * *